United States Patent [19]

Herzig et al.

[11] Patent Number: 5,621,057
[45] Date of Patent: Apr. 15, 1997

[54] ALKENYL ETHER-SILOXANE COMPOSITIONS WHICH CAN BE CROSSLINKED BY FREE RADICALS

[75] Inventors: Christian Herzig, Taching am See; Bernward Deubzer, Burghausen; Martina Bloechl, Tann, all of Germany; David Huettner, Tecumseh; Walter Magee, Adrian, both of Mich.

[73] Assignee: Wacker-Chemie GmbH, Munich, Germany

[21] Appl. No.: 455,489

[22] Filed: May 31, 1995

[30] Foreign Application Priority Data

Jun. 8, 1994 [DE] Germany ............... 44 20 062.5

[51] Int. Cl.$^6$ .................................. C08F 26/00
[52] U.S. Cl. .................. 526/248; 526/249; 526/250; 526/255; 526/262; 526/273; 526/279; 526/292.4; 526/321
[58] Field of Search ................. 526/262, 279, 526/248–250, 255, 273, 292.4, 321

[56] References Cited

U.S. PATENT DOCUMENTS

| | | | |
|---|---|---|---|
| 5,057,549 | 10/1991 | Herzig et al. | 522/99 |
| 5,118,772 | 6/1992 | Herzig et al. | 526/279 |
| 5,134,203 | 7/1992 | Hockemeyer et al. | 525/479 |
| 5,145,915 | 9/1992 | Weitemeyer et al. | 525/479 |
| 5,231,157 | 7/1993 | Herzig et al. | 528/15 |

FOREIGN PATENT DOCUMENTS

| | | |
|---|---|---|
| 0105341 | 1/1987 | European Pat. Off. . |
| 0273448 | 7/1988 | European Pat. Off. . |
| 0322808 | 7/1989 | European Pat. Off. . |
| 0396130 | 11/1990 | European Pat. Off. . |
| 0439777 | 8/1991 | European Pat. Off. . |
| 0449050 | 10/1991 | European Pat. Off. . |
| 0578087 | 1/1994 | European Pat. Off. . |
| WO93/22369 | 11/1993 | WIPO . |
| WO93/22368 | 11/1993 | WIPO . |

*Primary Examiner*—Mark D. Sweet
*Attorney, Agent, or Firm*—Martin Connaughton

[57] ABSTRACT

Alkenyl ether-siloxane compositions comprising (A) an oligomeric or polymeric organosilicon compound having on average more than one alkenyloxy group of the formula $$R^2-CH=CH-O- \qquad (VI)$$

(B) a monomeric maleic and/or fumaric acid compound of the formula $$R^3-O-\underset{\underset{O}{\|}}{C}-CR^4=CR^4-\underset{\underset{O}{\|}}{C}-O-R^3 \qquad (VII)$$

or $$\underset{\underset{}{\underbrace{\overset{O}{\overset{\|}{C}}-CR^4=CR^4-\overset{O}{\overset{\|}{C}}}_{Z}}}{} \qquad (VIII)$$

in which $R^2$ is a hydrogen atom or the methyl radical, $R^3$ is identical or different and is a hydrogen atom, a hydrocarbon radical having 1 to 16 carbon atoms, which can be interrupted by oxygen, sulfur or oxygen- or silicon-containing units, a substituted hydrocarbon radical having 1 to 6 carbon atoms, a silyl radical or a siloxanyl radical, $R^4$ is identical or different and is a hydrogen atom, chlorine, bromine, fluorine or an optionally substituted alkyl radical and Z is an oxygen atom or a radical $-NR^5-$, where $R^5$ has one of the meanings given for $R^3$, optionally (C) initiators which form free radicals and optionally (D) inhibitors for regulating the pot life.

8 Claims, No Drawings

ALKENYL ETHER-SILOXANE COMPOSITIONS WHICH CAN BE CROSSLINKED BY FREE RADICALS

FIELD OF INVENTION

The present invention relates to alkenyl ether-siloxane compositions and to a process for free radical crosslinking of these compositions.

BACKGROUND OF INVENTION

Organopolysiloxanes containing vinyl ether groups and curing thereof under UV irradiation or in an electron beam, in particular with the addition of onium initiators having a cationic actions are already known. Reference may be made to, for example, EP 105 341 B (General Electric Co., published on Jan. 7, 1987), U.S. Pat. No. 5,145,915 (Th. Goldschmidt AG; issued on Sep. 8, 1992) and corresponding EP 449 050 A, U.S. Pat. No. 5,057,549 and U.S. Pat. No. 5,118,772 (Wacker-Chemie GmbH; issued on Oct. 15, 1991 and Jun. 2, 1992) and corresponding EP 396 130 A, U.S. Pat. No. 5,231,157 (Wacker-Chemie GmbH; issued on Jul. 27, 1994) and corresponding EP 439 777 A, WO 93/22368 and WO 93/22369 (Wacker-Chemie GmbH; published on Nov. 11, 1993).

EP 322 808 (PPG Industries, Inc., published on Jul. 5, 1989) describes compositions which cure completely under UV irradiation and comprise an unsaturated polyester component and a vinyl ether component having at least two vinyl ether groups. During treatment of the vinyl ether component under UV with an initiator and in an electron beam without an initiator, the vinyl ether component remains unchanged. Curing is not possible under the above conditions without the addition of the polyester component.

SUMMARY OF INVENTION

The present invention relates to alkenyl ether-siloxane compositions comprising (A) an oligomeric or polymeric organosilicon compound having on average more than one alkenyloxy group of the formula $$R^2-CH=CH-O- \quad (VI)$$

in which

R$^2$ is a hydrogen atom or the methyl radical, (B) a monomeric maleic and/or fumaric acid compound of the formula

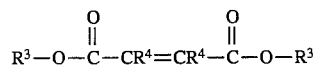

or

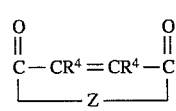

in which

R$^3$ is identical or different and is a hydrogen atom, a hydrocarbon radical having 1 to 16 carbon atoms, which can be interrupted by oxygen, sulfur or oxygen- or silicon-containing units, a substituted hydrocarbon radical having 1 to 6 carbon atoms, a silyl radical or a siloxanyl radical, R$^4$ is identical or different and is a hydrogen atom, chlorine, bromine, fluorine or an optionally substituted alkyl radical and Z is an oxygen atom or a radical —NR$^5$—, where R$^5$ has one of the meanings given for R$^3$, optionally (C) initiators which form free radicals and optionally (D) inhibitors for regulating the pot life.

The organosilicon compound (A) employed according to the invention are any desired organosilicon compounds which are known to date and have at least two silicon atoms and on average more than one alkenyloxy group of formula (VI).

Preferably, in the organosilicon compounds (A) employed according to the invention, the grouping of formula (VI) is linked to the silicon atom via an SiC linkage. Where the radical R$^2$ in formula (VI) is the methyl radical, the radical can be either the cis-1-propyleneoxy radical or the trans-1-propylenoxy radical.

The organosilicon compounds (A) employed according to the invention are preferably those having on average more than one alkenyloxy group according to the above mentioned EP 105 341 B, EP 396 130 A, EP 449 050 A, EP 439 777 A, WO 93/22368 and WO 93/22369, the publications mentioned being hereby incorporated by reference.

The organosilicon compounds (A) employed according to the invention are more preferably siloxane copolymers according to WO 93/22368 which comprise on average more than one vinyloxy group and comprise (a) siloxane units of the formula

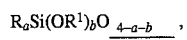 (I)

in which

R is identical or different, optionally halogenated hydrocarbon radicals having 1 to 18 carbon atoms per radical, R$^1$ is identical or different alkyl radicals having 1 to 4 carbon atoms per radical, which can be substituted by an ether oxygen atom, a is 0, 1, 2 or 3, b is 0, 1, 2 or 3 and the sum a+b is not greater than 3, (b) at least two units per molecule chosen from the group consisting of units of the formulae

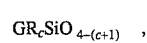 (II)

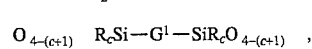 (III)

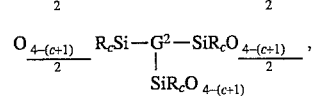 (IV)

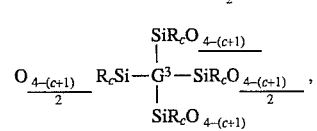 (V)

in which

R has the meaning given above c is 0, 1 or 2,

G is a radical of the formula
—CH$_2$CH$_2$OY(OCH=CH$_2$)$_{x-1}$ in which
- Y is a divalent, trivalent, tetravalent, pentavalent or hexavalent hydrocarbon radical having 2 to 20 carbon atoms per radical, which can be substituted by groups of the formula —OH,
  —$OR^2$ (in which $R^2$ is an alkyl radical having 1 to 6 carbon atoms per radical),
  —$OSiR^3{}_3$ (in which $R^3$ is a methyl, ethyl, isopropyl, tert-butyl or phenyl radical),

(in which $R^2$ has the meaning given above or —X (in which X is a halogen atom) or can be interrupted by at least one oxygen atom or one carboxyl or one carbonyl group, and
  x is 2, 3, 4, 5 or 6,
$G^1$ is a radical of the formula

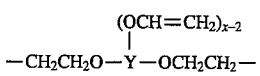

$G^2$ a radical of the formula

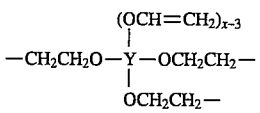

and
$G^3$ is a radical of the formula

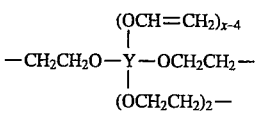

and
in which Y and x have the meaning given above.

Examples of the organosilicon compounds (A) employed according to the invention are copolymers of 3-(2-vinyloxyethoxy)propylmethylsiloxy, dimethylsiloxy and trimethylsiloxy units, copolymers of 3-(2-vinyloxyethoxy)propyldimethylsiloxy and dimethylsiloxy units, copolymers of prop-1-enoxypropyl-dimethylsiloxy, prop-1-enoxypropylmethylsiloxy and dimethylsiloxy units, reaction products of triethylene glycol divinyl ether with copolymers of hydridomethylsiloxy, dimethylsiloxy and trimethylsiloxy units (according to WO 93/22368), reaction products of butanediol vinyl ether with copolymers of hydridomethylsiloxy and trimethylsiloxy units, and reaction products of poly-tetrahydrofuran divinyl ether 290 with copolymers of hydridomethylsiloxy, hydridodimethylsiloxy and dimethylsiloxy units (according to WO 93/22368).

The organosilicon compounds (A) employed according to the invention are, in particular, product mixtures which are prepared in accordance with the Application WO 93/22368.

As described in the above mentioned publications, the organosilicon compounds (A) employed according to the invention can be prepared by known processes, such as, by hydrosilylation of allyl vinyl ethers according to EP 105 341 B, hydrosilylation of allyl ethers having several allyl groups and subsequent isomerization of the remaining allyloxy functions to give prop-1-enyloxy functions according to EP 396 130 A, or by reaction of an organic compound containing more than two vinyloxy groups with an organosilicon compound having at least one Si-bonded hydrogen atom per molecule in the presence of a hydrosilylation catalyst.

The viscosity of the organosilicon compound (A) employed according to the invention is preferably 10 to 50000 mm²/s at 25° C., more preferably 50 to 5000 mm²/s.

The number of radicals of formula (VI) per kg of organosilicon compound (A) employed according to the invention is preferably 0.1 to 3 molar equivalents, the range from 0.5 to 2 molar equivalents/kg of compound (A) being more preferred.

The organosilicon compounds (A) according to the invention preferably comprise on average more than 1.3 alkenyloxy groups of formula (VI). Component (A) can also comprise oligomeric or polymeric organosilicon compounds which contain only one radical $R^2$—CH=CH—O— or none of these radicals.

The organosilicon compounds (A) according to the invention are preferably completely miscible with component (B).

The organosilicon compound (A) employed according to the invention can be a single type or a mixture of various types of such organosilicon compounds.

Examples of radical $R^3$ are alkyl radicals, such as the methyl, ethyl, n-propyl, iso-propyl, n-butyl, iso-butyl, tert-butyl, n-pentyl, iso-pentyl, neo-pentyl and tert-pentyl radical, hexyl radicals, such as n-hexyl radical, heptyl radicals, such as the n-heptyl radical, octyl radicals, such as the n-octyl radical and iso-octyl radicals, such as the 2,2,4-trimethylpentyl radical, nonyl radicals, such as the n-nonyl radical, decyl radicals, such as the n-decyl radical, dodecyl radicals, such as the n-dodecyl radical, and hexadecyl radicals, such as the n-hexadecyl radical, cycloalkyl radicals, such as cyclopentyl, cyclohexyl and cycloheptyl radicals and methylcyclohexyl radicals, alkenyl radicals, such as the allyl, 5-hexenyl and cyclohexenylethyl radical, oxygen-containing radicals, such as the 2-ethoxyethyl, 3,6-dioxaoctyl, 3,6,9-trioxadecyl, 2-acetoxyethyl and 2-(2-acetoxyethyloxy)ethyl radical, and silicon-containing radicals, such as the 3-triethylsilylpropyl and the 4-trimethylsiloxybutyl radical.

Radical $R^3$ is preferably methyl, ethyl, n-butyl, n-octyl, 2-ethylhexyl, decyl and dodecyl radicals, the ethyl, n-butyl and 2-ethylhexyl radical being more preferred.

Examples of an optionally substituted alkyl radical $R^4$ are the methyl, ethyl, butyl and trichloromethyl radical.

Radical $R^4$ is preferably a hydrogen atom or chlorine atom.

Compound (B) is preferably dimethyl maleate, diethyl maleate, diallyl maleate, dibutyl fumarate, dioctyl maleate, monooctyl maleate, dibutyl maleate and bis(2-ethylhexyl) maleate.

The compound (B) employed according to the invention can be a single type or a mixture of various types of such compounds.

The compositions according to the invention can comprise the organosilicon compounds (A) and the compounds (B) in a ratio which varies within wide limits, this depending on the stoichiometry of these compounds. The numerical ratio of $R^2$—CH=CH—O— groups of compound (A) to —$CR^4$=$CR^4$— groups in compound (B) is thus preferably in the range from 0.2 to 5.0, more preferably from 0.7 to 1.8, in particular from 1.0 to 1.2.

The compositions according to the invention can be crosslinked under the influence of high-energy radiation. Many types of radiation are suitable such as, electron beams, γ rays, X-rays, UV light, for example, that having wavelengths in the range from 200 to 400 nm, and visible light such as that having a wavelength of 400 to 600 nm, or so-called "halogen light". Ultraviolet light can be generated, in xenon, low pressure mercury, medium pressure mercury or high pressure mercury lamps.

The present invention further relates to a process for crosslinking the alkenyl ether-siloxane compositions according to the invention by irradiation with high-energy radiation.

The high-energy radiation by which the compositions according to the invention are crosslinked is preferably UV light in the range of 200 to 400 nm or an electron beam.

The compositions according to the invention can also crosslink by purely thermal means without high-energy radiation being supplied, and for this reason they also have only a limited stability when this radiation is excluded. However, this so-called pot life is a multiple of the crosslinking time under the influence of high-energy radiation. Although curing by purely thermal means is possible, it is not preferred.

The alkenyl ether-siloxane compositions according to the invention preferably comprise initiators (C) which form free radicals, Although a suitable combination of component (A) with component (B) can also be cured without the optional constituent (C), for example, by an electron beam, the addition of free radical initiators which absorb radiating energy and then dissociate into free radicals results in an increase in the rate of crosslinking.

Examples of initiators (C) which are optionally employed are benzoin ethers, such as benzoin n-butyl ether, benzil ketals, such as benzil dimethyl ketal, $\alpha,\alpha$-dialkoxyacetophenones, such as $\alpha,\alpha$-diethoxyacetophenones, $\alpha$-hydroxyalkylphenones, such as 1-hydroxycyclohexyl phenyl ketone and 2-hydroxy-2-methyl-1-phenylpropan-1-one, $\alpha$-aminoalkylphenones, such as 2-methyl-1-[4-(methylthio)phenyl]-2-morpholinopropan-1-one, acylphosphine oxides, such as 2,4,6-trimethylbenzoyl-diphenylphosphine oxide, and bisacylphosphine oxides, such as bis (2,6-dimethoxybenzoyl)isooctylphosphine oxide.

Ketones, such as benzophenone, 1-chloro-4-propoxythioxanthone, isopropylthioxanthone and thioxanthone, also act as the initiator (C), but preferably in combination with amino initiators, such as triethanolamine or 2-n-butoxyethyl 4-(dimethylamino)benzoate.

The initiators (C) optionally employed according to the invention can be a single type or a mixture of various types of such initiators.

Initiators (C) are preferably employed in amounts of 0.5% to 5% by weight, more preferably 1% to 3% by weight, based on the total weight of (A) and (B).

For reasons of better handling, it is preferable to add small amounts of an inhibiting component (D) to a mixture of (A)+(B) or (A)+(B)+(C) in order to prevent premature crosslinking of a usable formulation during storage. The task of these substances is to deactivate free radicals formed and therefore delay or prevent the start of free radical polymerization of groups having the structure $R^2$—CH=CH—O— with molecules of component (B).

If large amounts of free radicals are liberted by irradiation or considerable warming, this leads to a rapid consumption of the inhibitor molecules (D), and complete curing of the composition according to the invention starts very suddenly.

Examples of inhibitors (D) which are optionally employed are all the customary inhibitors which have been employed to date in processes which proceed by free radicals, such as hydroquinone, 4-methoxyphenol, 2,6-ditert-butyl-4-methylphenol or phenothiazine.

The inhibitor (D) optionally employed according to the invention can be a single type or a mixture of various types of such inhibitors.

Inhibitors (D) are preferably employed in amounts of 10 to 10,000 ppm, more preferably 50 to 400 ppm, based on the total weight of the alkenyl ether-siloxane composition according to the invention.

The crosslinking by radiation is preferably carried out at a temperature of 0° to 100° C., more preferably 20° to 60° C., under the pressure of the surrounding atmosphere of 900 to 1100 hPa.

It is possible, but not preferably, to cure the alkenyl ether-siloxane compositions according to the invention exclusively by means of heat, in which case the addition of peroxides or azo compounds (E) which form free radicals is preferred.

Examples of component (E) which is optionally added are lauroyl peroxide, benzoyl peroxide, 2,4-dichlorobenzoyl peroxide and azoisobutyronitrile.

The thermal crosslinking is preferably carried out at a temperature of 50° to 200° C., more preferably 70° to 150° C., under the pressure of the surrounding atmosphere, that is to say 900 to 1100 hPa.

The compositions according to the invention can also comprise additives, for example, fillers, pigments and adhesion promoters, such as silanes or epoxide compounds.

The alkenyl ether-siloxane compositions according to the invention have the advantage that component (A) has an excellent compatibility with the monomeric component (B) and clear mixtures are therefore obtained without phase separation. Since component (B) is exclusively monomeric compounds, the considerable advantage that compositions according to the invention having a viscosity of 10 to 100 mm$^2$/s at 25° C. are obtainable results. The compositions according to the invention furthermore have the advantage that they crosslink in a simple manner and very easily to give solid coatings or shaped articles.

The compositions according to the invention can be employed in all instances where crosslinkable compositions based on alkenyl ether-siloxanes have been employed to date.

For example, the compositions according to the invention are outstandingly suitable for the production of solid coatings or shaped articles.

Examples of surfaces onto which the coatings according to the invention can be applied are those of paper, wood, cork, films of plastics, for example polyethylene films or polypropylene films, ceramic objects, glass, including glass fibers, metals, pasteboards, including those of asbestos, and of woven and non-woven cloth of natural or synthetic organic fibers.

Application of the alkenyl ether-siloxane compositions according to the invention to the surfaces to be coated can be carried out in any desired manner which is suitable for the production of coatings from liquid substances and is known for example, by dipping, brushing, pouring, spraying, rolling on, printing, for example by means of an offset gravure coating device, or knife or doctor blade coating.

The compositions according to the invention are particularly suitable for use in printing inks which cure by radiation.

In the examples described below, all the parts and percentages data relate to the weight, unless stated otherwise. Unless stated otherwise, the examples below are carried out under a pressure of the surrounding atmosphere of under about 1000 hPa, and at room temperature at about 20° C., or at a temperature which is established when the reactants are brought together at room temperature without additional heating or cooling.

All the viscosity data in the following are based on a temperature of 25° C.

EXAMPLE 1

277 g of diethylene glycol divinyl ether diluted with 43 g of n-butyl acetate are allowed to react with a total of 111 g of a short-chain equilibrate of hydridomethylsiloxy and trimethylsiloxy units in the presence of 5 mg of platinum in the form of a platinum-1,3-divinyl-1,1,3,3-tetramethyldisiloxane complex in accordance with the process described in the above mentioned WO 93/22368. The hydrogen siloxane equilibrate employed has a viscosity of 1.4 mm²/s and a content of active hydrogen of 0.90%. Work up is carried out at 140° C. under 3 hPa and gives 236 g of a vinyl ether-siloxane copolymer of 96 mm²/s and with a vinyloxy equivalent weight of 384 g/mol of C=C—O.

5.0 g of the vinyl ether-siloxane copolymer thus obtained are mixed with 1.9 g of dimethyl maleate, 0.7 mg of 2,6-ditert-butyl-4-methylphenol and 0.2 g of 2-hydroxy-2-methyl-1-phenylpropan-1-one. The mixture is homogeneous and has a viscosity of about 60 mm²/s. Under UV light from an Hg medium pressure lamp (240 to 700 nm) a 100 μ coating on aluminum foil has cured thoroughly after the action of 0.15 J/cm².

EXAMPLE 2

800 g of an equilibrate of hydridomethylsiloxy, hydridodimethylsiloxy and dimethylsiloxy units having an active hydrogen content of 0.089% and an average molecular weight of about 3000 are reacted with 178 g of 1,4-butanediol divinyl ether under the action of tris(triphenylphosphine)rhodium chloride, the so-called Wilkinson catalyst (corresponding to 4 ppm of Rh, based on the total weight of the reaction mass), in a hydrosilylation reaction in accordance with the process described in the above mentioned WO 93/22368. When conversion is complete, excess divinyl ether is removed at 120° C. under 3 hPa, after which a vinyl ether-siloxane copolymer having a viscosity of 350 mm²/s, a silicone content of 91% by weight (calculated as the sum of all the methylsiloxy units, based on the copolymer) and a content of vinyloxy groups of 2.4% by weight is obtained.

9.0 g (5 mmol of H₂C=CH—O) of the vinyl ether-siloxane copolymer thus obtained are mixed with 1.2 g of dibutyl maleate, 1 mg of 2,6-ditert-butyl-4-methylphenol and 0.3 g of 2-hydroxy-2-methyl-1-phenylpropan-1-one. The mixture is homogeneous and has a viscosity of about 300 mm²/s. Under UV light from an Hg medium pressure lamp (240 to 700 nm), a 100 μ coating on aluminum foil has cured thoroughly after the action of 0.2 J/cm².

What is claimed is:
1. Alkenyl ether-siloxane compositions comprising

(A) an oligomeric or polymeric organosilicon compound having on average more than one alkenyloxy group of the formula $$R^2-CH=CH-O-  \quad (VI)$$

in which
   $R^2$ is a hydrogen atom or a methyl radical, (B) a monomeric maleic and/or fumaric acid compound of the formula $$R^3-O-\overset{O}{\underset{\|}{C}}-CR^4=CR^4-\overset{O}{\underset{\|}{C}}-O-R^3 \quad (VII)$$

or

(VIII)

in which
   $R^3$ is identical or different and is a hydrogen atom, a hydrocarbon radical having 1 to 16 carbon atoms, which is optionally interrupted by oxygen, sulfur or oxygen- or silicon-containing units, a substituted hydrocarbon radical having 1 to 6 carbon atoms, a silyl radical or a siloxanyl radical,
   $R^4$ is identical or different and is a hydrogen atom, chlorine, bromine, fluorine or an optionally substituted alkyl radical and
   Z is an oxygen atom or a radical $-NR^5-$, where $R^5$ has one of the meanings given for $R^3$,
optionally
(C) initiators which form free radicals and
optionally
(D) inhibitors for regulating pot life.

2. An alkenyl ether-siloxane composition as claimed in claim 1, wherein the organosilicon compound (A) is a siloxane copolymer which contains on average more than one vinyloxy group and comprises (a) siloxane units of the formula $$R_aSi(OR^1)_bO_{\frac{4-a-b}{2}}, \quad (I)$$

in which
   R is identical or different, optionally halogenated hydrocarbon radicals having 1 to 18 carbon atoms per radical,
   $R^1$ is identical or different alkyl radicals having 1 to 4 carbon atoms per radical, which can be substituted by an ether oxygen atom,
   a is 0, 1, 2 or 3,
   b is 0, 1, 2 or 3
   and the sum a+b is not greater than 3, (b) at least two units per molecule chosen from the group consisting of units of the formulae $$GR_cSiO_{\frac{4-(c+1)}{2}}, \quad (II)$$

$$O_{\frac{4-(c+1)}{2}}R_cSi-G^1-SiR_cO_{\frac{4-(c+1)}{2}}, \quad (III)$$

$$O_{\frac{4-(c+1)}{2}}R_cSi-G^2-SiR_cO_{\frac{4-(c+1)}{2}} \atop {|\atop SiR_cO_{\frac{4-(c+1)}{2}}}, \quad (IV)$$

$$O_{\frac{4-(c+1)}{2}}R_cSi-G^3-SiR_cO_{\frac{4-(c+1)}{2}} \atop {|\atop SiR_cO_{\frac{4-(c+1)}{2}}} \atop {SiR_cO_{\frac{4-(c+1)}{2}}}, \quad (V)$$

in which
   R has the meaning given above c is 0, 1 or 2,
G is a radical of the formula
—CH$_2$CH$_2$OY(OCH=CH$_2$)$_{x-1}$ in which
is a divalent, trivalent, tetravalent, pentavalent or hexavalent hydrocarbon radical having 2 to 20 carbon atoms per radical, which can be substituted by groups of the formula —OH, —OR$^2$ in which R$^2$ is an alkyl radical having 1 to 6 carbon atoms per radical —OSiR$^3{}_3$ in which R$^3$ is a methyl, ethyl, isopropyl, tert-butyl or phenyl radical $$-\underset{\underset{O}{\|}}{O}CR^2$$

in which R$^2$ has the meaning given above or
—X in which X is a halogen atom or can be interrupted by at least one oxygen atom or one carboxyl or one carbonyl group, and
x is 2, 3, 4, 5 or 6,
G$^1$ is a radical of the formula $$-CH_2CH_2O-\underset{|}{Y}-OCH_2CH_2-$$
$$\text{(OCH=CH}_2)_{x-2}\text{ above}$$

G$^2$ is a radical of the formula $$-CH_2CH_2O-\underset{\underset{OCH_2CH_2-}{|}}{\overset{(OCH=CH_2)_{x-3}}{\underset{|}{Y}}}-OCH_2CH_2-$$

and

G$^3$ is a radical of the formula $$-CH_2CH_2O-\underset{\underset{(OCH_2CH_2)_2-}{|}}{\overset{(OCH=CH_2)_{x-4}}{\underset{|}{Y}}}-OCH_2CH_2-$$

and
in which Y and x have the meaning given above.

3. An alkenyl ether-siloxane composition as claimed in claim 1, wherein the viscosity of the organosilicon compound (A) employed is 10 to 50,000 mm$^2$/s at 25° C.

4. An alkenyl ether-siloxane composition as claimed in claim 1, wherein the number of radicals of formula (VI) per kg of organosilicon compound (A) is 0.1 to 3 molar equivalents.

5. An alkenyl ether-siloxane composition as claimed in claim 1, wherein compound (B) is one chosen from the group consisting of dimethyl maleate, diethyl maleate, diallyl maleate, dibutyl fumarate, dibutyl maleate, bis(2-ethylhexyl) maleate, dioctyl maleate and monooctyl maleate.

6. An alkenyl ether-siloxane composition as claimed in claim 1, comprising (C) initiators which form free radicals.

7. An alkenyl ether-siloxane composition as claimed in claim 1, comprising
   (C) initiators which form free radicals and
   (D) inhibitors for regulating pot life.

8. A process for crosslinking an alkenyl ether-siloxane composition as claimed in claim 1, by irradiation with high-energy radiation.

* * * * *